US008224563B2

(12) United States Patent
Muramatsu et al.

(10) Patent No.: US 8,224,563 B2
(45) Date of Patent: Jul. 17, 2012

(54) RUNNING ROUTE ACQUIRING SYSTEM AND ARRIVAL NOTIFYING SYSTEM FOR TOURING BUS

(75) Inventors: Harushi Muramatsu, Shizuoka (JP); Hiroki Oishi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/979,137

(22) Filed: Oct. 31, 2007

(65) Prior Publication Data

US 2008/0065324 A1 Mar. 13, 2008

Related U.S. Application Data

(62) Division of application No. 10/784,263, filed on Feb. 24, 2004.

(30) Foreign Application Priority Data

Feb. 28, 2003 (JP) .................................. 2003-53421

(51) Int. Cl.
*G01C 21/00* (2006.01)

(52) U.S. Cl. .............. 701/209; 701/23; 701/25; 701/26; 701/408; 701/410; 701/411; 701/412; 701/418; 701/422; 701/445; 701/450; 701/451; 701/454; 701/465; 701/516; 701/517; 701/519; 701/521; 701/522; 340/988; 340/989; 340/994; 340/996

(58) Field of Classification Search .................. 701/117, 701/200, 201, 204, 207, 213, 302; 340/944, 340/989–996
See application file for complete search history.

(56) References Cited

U.S. PATENT DOCUMENTS

| | | | | |
|---|---|---|---|---|
| 5,400,020 A * | 3/1995 | Jones et al. | ................... | 340/994 |
| 5,736,940 A * | 4/1998 | Burgener | ....................... | 340/994 |
| 5,922,040 A * | 7/1999 | Prabhakaran | ................. | 701/117 |
| 5,987,377 A * | 11/1999 | Westerlage et al. | ........... | 701/454 |

(Continued)

FOREIGN PATENT DOCUMENTS

JP 2002-334397 11/2002

OTHER PUBLICATIONS

German Office Action dated Jul. 7, 2011, issued for counterpart German Patent Application No. 2004-009-121.8 with English translation.

*Primary Examiner* — Jonathan M Dager
(74) *Attorney, Agent, or Firm* — Kratz, Quintos & Hanson, LLP

(57) ABSTRACT

The latitude/longitude and time acquired at prescribed sampling time intervals by a touring bus 1 which runs a predetermined running route are wireless-transmitted. A user 6 specifies a getting-on/off point on the basis of the latitude/longitude and time provided by the touring bus and acquires a running route inclusive of the getting-on/off point. Therefore, the user can acquire the running route inclusive of the getting-on/off point easily and instantaneously. The user can specify the getting-on/off point using the speed computed from the latitude/longitude and time acquired. Thus, the user can set his desired notifying point on the running route thus acquired. In such a configuration, there are provided a system for permitting a user of a touring bus to acquire a running route of the touring bus inclusive of a getting-on/off point easily and instantaneously and a system for notifying the arrival of the touring bus which permits the user to set his desired notifying point easily.

2 Claims, 8 Drawing Sheets

U.S. PATENT DOCUMENTS

| | | | | |
|---|---|---|---|---|
| 6,014,081 | A | 1/2000 | Kojima et al. | |
| 6,037,881 | A * | 3/2000 | Bornhauser et al. | 340/994 |
| 6,191,708 | B1 * | 2/2001 | Davidson | 701/465 |
| 6,232,915 | B1 | 5/2001 | Dean et al. | |
| 6,411,897 | B1 | 6/2002 | Gaspard, II | |
| 6,492,912 | B1 * | 12/2002 | Jones | 340/994 |
| 6,646,595 | B1 * | 11/2003 | Heng et al. | 342/357.43 |
| 6,748,318 | B1 * | 6/2004 | Jones | 701/465 |
| 6,748,320 | B2 * | 6/2004 | Jones | 701/201 |
| 6,952,645 | B1 * | 10/2005 | Jones | 701/201 |
| 7,089,107 | B2 * | 8/2006 | Jones | 701/201 |
| 7,191,058 | B2 * | 3/2007 | Laird et al. | 701/516 |
| 7,202,801 | B2 * | 4/2007 | Chou | 340/994 |
| 7,206,837 | B2 * | 4/2007 | Seligmann | 709/224 |
| 7,262,696 | B2 * | 8/2007 | Aota et al. | 340/539.11 |
| 7,376,662 | B2 * | 5/2008 | Caparas et al. | 701/533 |
| 2002/0099500 | A1 * | 7/2002 | Schmier et al. | 701/200 |
| 2003/0014286 | A1 * | 1/2003 | Cappellini | 705/5 |
| 2003/0193414 | A1 * | 10/2003 | Jones | 340/994 |
| 2003/0229559 | A1 * | 12/2003 | Panttaja et al. | 705/36 |
| 2003/0233190 | A1 * | 12/2003 | Jones | 701/207 |
| 2006/0164259 | A1 * | 7/2006 | Winkler et al. | 340/944 |
| 2007/0024469 | A1 * | 2/2007 | Chou | 340/994 |

* cited by examiner

RUNNING ROUTE ACQUIRING SYSTEM AND ARRIVAL NOTIFYING SYSTEM FOR TOURING BUS

This is a divisional application of U.S. patent application Ser. No. 10/784,263, filed on Feb. 24, 2004.

BACKGROUND OF THE INVENTION

1. Field of the Invention

This invention relates to a system for permitting a user of a touring bus to acquire a running route of the touring bus and the getting-on/off point on the running route, and a system for notifying the user of the arrival of the touring bus at a prescribed point on the running route.

2. Description of the Related Art

A touring bus (hereinafter referred to as simply “bus”) is served which permits the users of a kindergarten, school or assisting facility to get on or off at a prescribed point and periodically runs a predetermined route. A system has been proposed which notifies the bus users that the bus has arrived at a predetermined getting-on/off point.

Such a kind of conventional system as disclosed in JP-A-2002-334397 has been proposed. In the conventional technique, the bus equipped with a communication device having a point acquiring function transmits to a management center through a relay corporation when the bus has entered a predetermined area in the vicinity of a getting on/off point. On the basis of the latitude/longitude thus transmitted, the management center transmits, through internet, to the communication terminal of the bus user the message on the time when the bus will arrive at the predetermined getting on/off point.

In such a system, in order that user receives the above message from the management center, the user first acquires the information on the running route from a bus service corporation or the management center, and thereafter, communicates his desired getting-on/off point on the running route to the management center. The person in charge in the management center performs various kinds of settings for transmitting the message for a server installed in the management center (see JP-A-2002-334397 (FIG. 8)).

Meanwhile, in the touring bus service as described above, frequently, the user or destination is changed. Correspondingly, the touring route or getting-on/off point is changed. In such a case, in the above conventional system, the bus service corporation first communicates to the management center the newest route including the newest getting on/off point information, and thereafter communicates it to the user. Next, referring to the newest route, the user communicates his desired point to the management center. The person in charge in the management center performs various settings such as getting-on/off points again.

Therefore, the above conventional system presents a problem that when any change is made on the running route or when the user wants to confirm the running route, the user cannot obtain the information on the newest running route at once. The above conventional system also presents a problem that when the getting-on/off point on the running route is changed, the person in charge in the management center must perform troublesome resetting operations. The users of the touring bus service include old men/women, physically handicapped persons, kindergarten children, etc. so that there are large individual differences in the time taken for the users to go from their home to the getting on/off point. Therefore, in the above conventional system in which the message is transmitted when the bus enters the area fixed in the vicinity of the getting-on/off point, the user may miss the bus or otherwise the bus must wait for the user.

SUMMARY OF THE INVENTION

A first object of this invention is to provide a system for permitting a user of a touring bus to acquire a running route of the touring bus inclusive of a getting-on/off point easily and instantaneously.

A second object of this invention is to provide a system for notifying the arrival of the touring bus which permits the user to set his desired notifying point easily.

In order to attain the first object, in accordance with this invention, as shown in FIG. 1, there is provided a touring bus running route acquisition system for permitting a user of a touring bus to acquire a running route of the touring bus inclusive of a getting-on/off point comprising: on the side of the touring bus 1 running the running route, latitude/longitude acquisition means 11B for acquiring its own latitude/longitude at predetermined sampling periods;

time acquisition means 11C for acquiring the time when the latitude/longitude is acquired; and terminal side communicating means 11A having a function of wireless-transmitting the latitude/longitude and time thus acquired, and on the side of the user 6, bus data acquisition means 6A for acquiring the latitude/longitude and time provided by the touring bus; and a getting-on/off point specifying means 6C for specifying a getting-on/off point on the basis of the speed computed from the latitude/longitude and time.

In accordance with this configuration, on the side of the touring bus 1 running the predetermined running route, the latitudes/longitudes and times acquired at predetermined sampling periods are wireless-transmitted. On the side of the user, the latitude/longitude and time provided by the touring bus are acquired and the getting-on/off point is specified on the basis of the speed computed from the latitude/longitude and time so that the running route including the getting-on/off point is acquired. Therefore, the user can acquire the running route including the getting-on/off point easily and instantaneously. The getting-on/off point can be specified using the speed computed from the latitude/longitude and time thus acquired.

Preferably, the running route is the newest running route. In accordance with this configuration, even if any change in the running route occurs, the user 6 can acquire the running route including the newest getting-on/off point.

Preferably, the getting-on/off point is a point where the speed is zero at a prescribed number of times of consecutive sampling periods. In accordance with this configuration, since the getting-on/off point is a point where the speed is zero at a prescribed number of times of consecutive sampling periods, the point where the bus stops suddenly owing to a traffic jam can be automatically excluded.

Preferably, the touring bus running route acquisition system further includes: storage means for storing the running route to which a formal route name is appended. In accordance with this configuration, the running route can be easily referred to or changed later.

In order to attain the second object, in accordance with this invention, there is provided an arrival notifying system for notifying a user from a management center that a touring bus arrives at a prescribed point on a running route using the touring bus running route acquisition system described above, comprising:

on the side of the user 6, a user side communication means 6A which is communicatable with the outside through a communication line inclusive of an internet;

notifying point setting means 6E for setting a desired notifying point on the running route that the user desires to be notified of arrival of the bus; and notifying means 6F for notifying the arrival in response to a predetermined notifying command transmitted through a communication line including the internet, and on the side of the management center 4, management center side communication means 4A which is communicatable with the terminal side transmitting means installed in the touring bus through the communication line including a wireless line and communicatable with the user side communication means through the communication line including the internet;

storage means 4B for storing the notifying point set by the user; and command issuing means 4C for comparing the latitude/longitude transmitted from the touring bus through the communication line including the wireless line with the stored notifying point to detect that the touring bus has arrived at the notifying point and issuing the notifying command.

In accordance with this configuration, the running route is previously acquired in the running route acquisition system. On the side of the user 6, a desired notifying point on the running route that the user desires to be notified of arrival of the bus is set and transmitted to the management center 4. On the side of the management center, the notifying point set by the user is previously stored. The latitude/longitude transmitted from the touring bus is compared with the stored notifying point to detect that the touring bus has arrived at the notifying point and the notifying command is transmitted to the user 6. The user is notified of the arrival in response to the notifying command. Therefore, the user can easily set his desired notifying point without the assistance by the person in charge of the management center 4. Further, the change in the running route or individual difference in users can be flexibly dealt with.

Preferably, the notifying point is one of the getting-on/off points specified on the basis of the speed computed from the latitude/longitude and time.

This configuration facilitates the selection of the notifying point.

Preferably, the getting-on/off point is appended with an arrival scheduled time computed on the basis of the time.

This configuration permits the user to set the notifying point so that he can get on his desired bus.

Preferably, the notifying means notifies the arrival using an audio signal and a video signal.

In accordance with this configuration, the old person or physically handicapped person, who frequently use a welfare bus which is one of the touring buses, can also surely recognize the notification of arrival.

The above and other objects and features of the invention will be more apparent from the following description taken in conjunction with the accompanying drawings.

DESCRIPTION OF THE PREFERRED EMBODIMENTS

Figure 1:
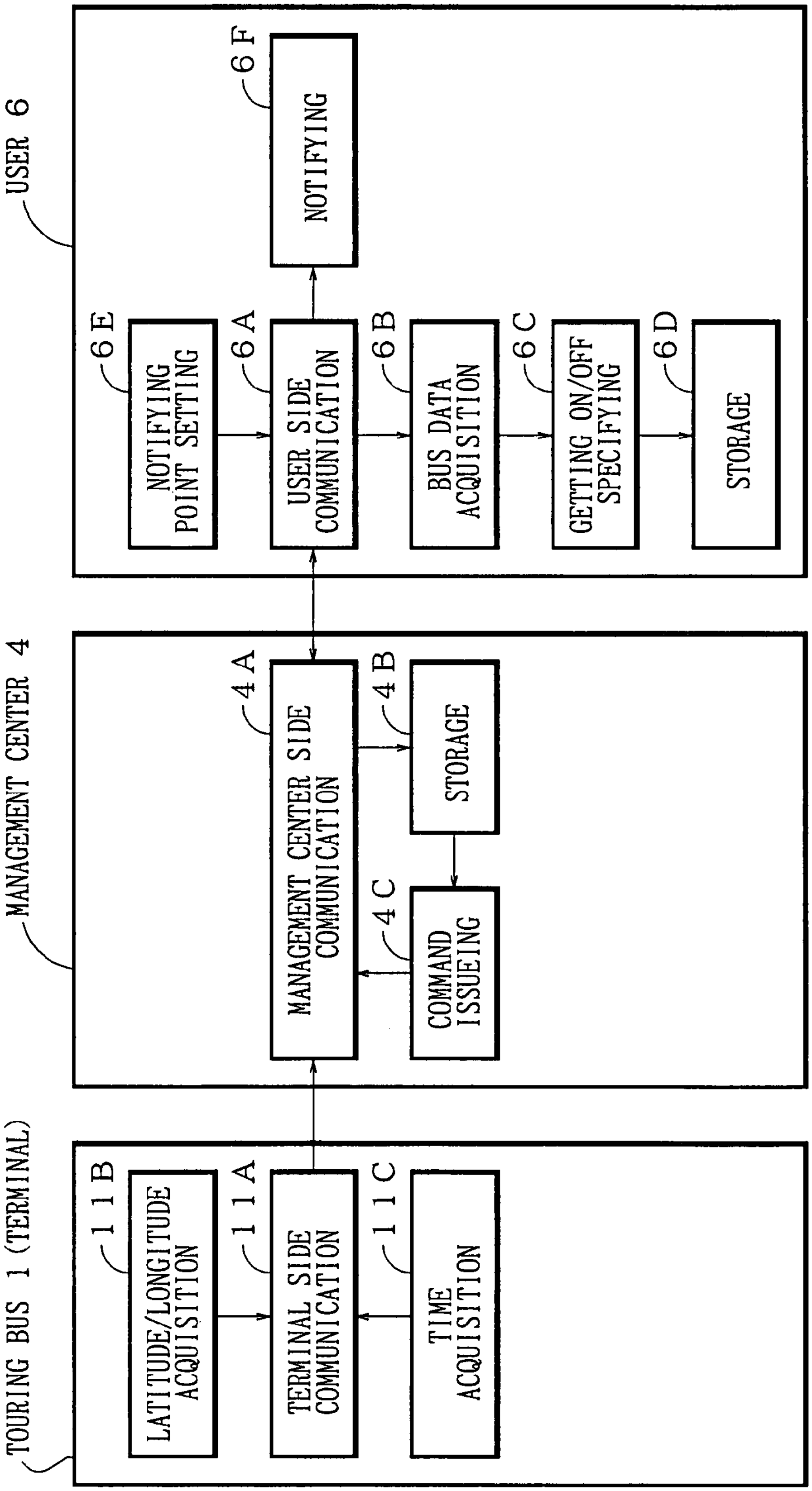
FIG. 1 is a block diagram of the basic arrangement of this invention.

Now referring to the drawings, an explanation will be given of various embodiments of this invention.

Figure 2:
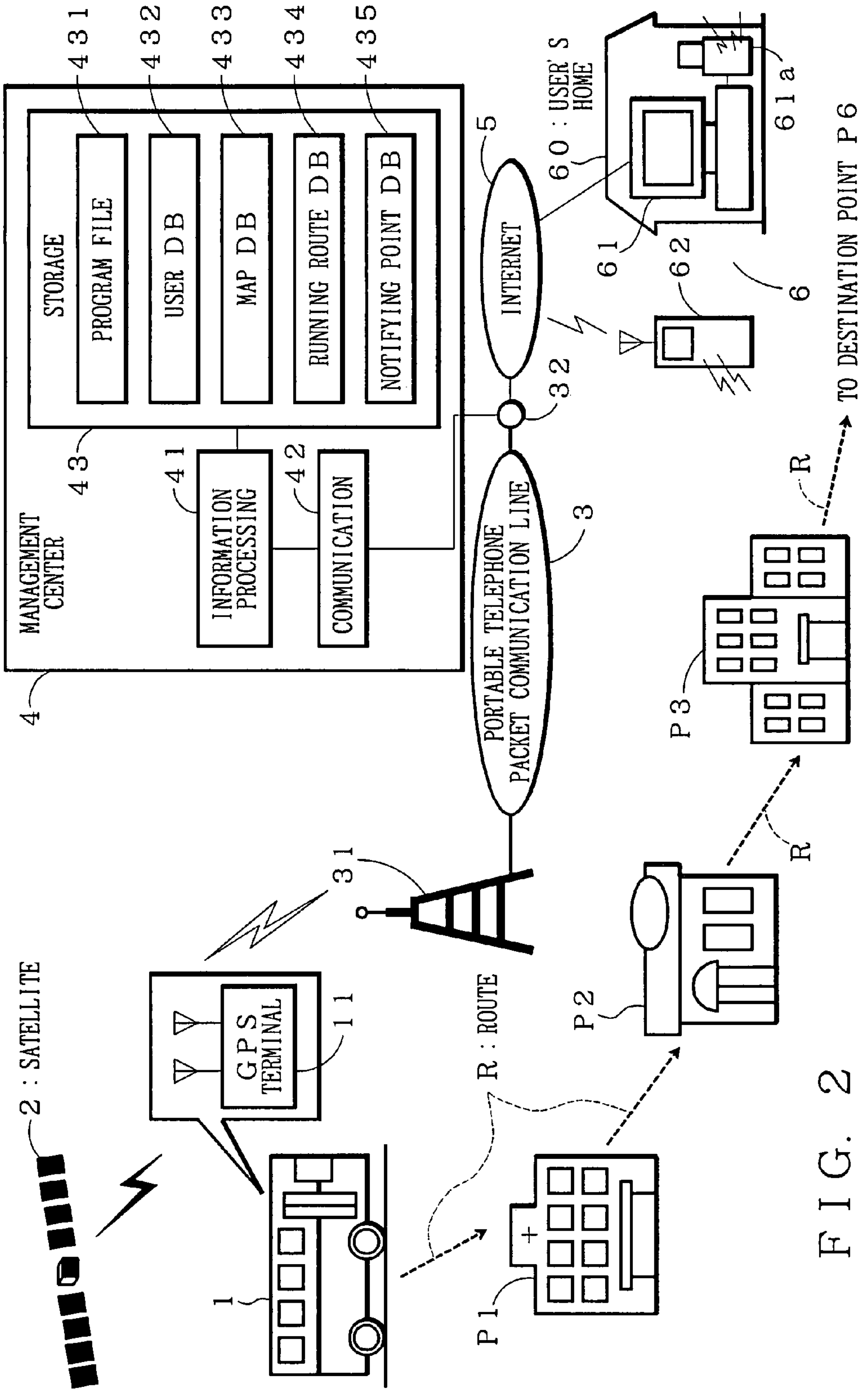
FIG. 2 is a view showing the system arrangement of an embodiment of this invention.

FIG. 2 is a view showing a running route acquisition system and arrival notifying system for a touring bus according to this invention. As seen from FIG. 2, in this system, a touring bus 1, a management center 4 and a user 6 are communication-connected through a predetermined line. The touring bus 1 runs to a predetermined destination point through getting-on/off points P1, P2 and P3 on a predetermined running route R. The touring bus 1 is equipped with a GPS terminal 11 capable of receiving a GPS signal to acquire the latitude/longitude of one's own bus and the corresponding time and capable of communicating with the management center. Although not shown, the touring bus 1 is also equipped with a battery.

Incidentally, in this invention, the touring bus 1 is defined as a bus such as a pick-up bus to a kindergarten or assistance facility which periodically runs a predetermined running route while causing the user to get on/off at a predetermined point. The running route may not necessarily closed as illustrated in this embodiment. Actually, although there are plural touring buses and users, only a single set of bus and user is illustrated in FIG. 2.

The GPS terminal 11 receives a GPS signal which is a positioning wave supplied from one of a plurality of GPS satellites 2 of a GPS (Global Positioning System) and latitude/longitude of the present location of one's own bus and the corresponding time using the GPS signal. The GPS terminal 11 transmits the latitude/longitude and time to the management center 4 through a cellular telephone packet communication network 3.

The cellular telephone packet communication network 3 uses "DoPa" serviced e.g. by NTT Docomo Corporation (Japan). This service is a data communication service using a packet exchange system in the cellular telephone network. The "DoPa" is a charging system in which a communication fee is calculated in accordance with the communicated data amount. This charging system can provide the service with a low fee. The cellular telephone packet communication network 3 is communication-connected to the GPS terminal 11 through a wireless base station 31.

The management center 4 is an ASP (Application Service Provider) connected to the user 6 through internet 5. The management center 4 includes an information processing device 41, a communication device 42 and a storage device 43. The communication device 42 includes a router and a DSU (digital service unit). The management center 4 supplies the data about the running of the touring bus 1 to the user as the occasion demands or provides a bus arrival notifying service described later. The ASP is an enterprise which provides various services using a wire area communication network such as internet, which have spread in recent years. The assignee of this application is one of the ASPs. An information processing device 41 is a computer for receiving information through the communication device 42 to perform the communication function and processing of creating road information. The information processing device includes a CPU, RAM and ROM. The storage device 43 stores a program file 431, a user database 432, a map database 433, a running route database 434 and a notifying point database 435. Incidentally, the above communication device 42 and storage device 43 correspond to communication means on the side of a management center and storage means defined in claims.

Figure 4:
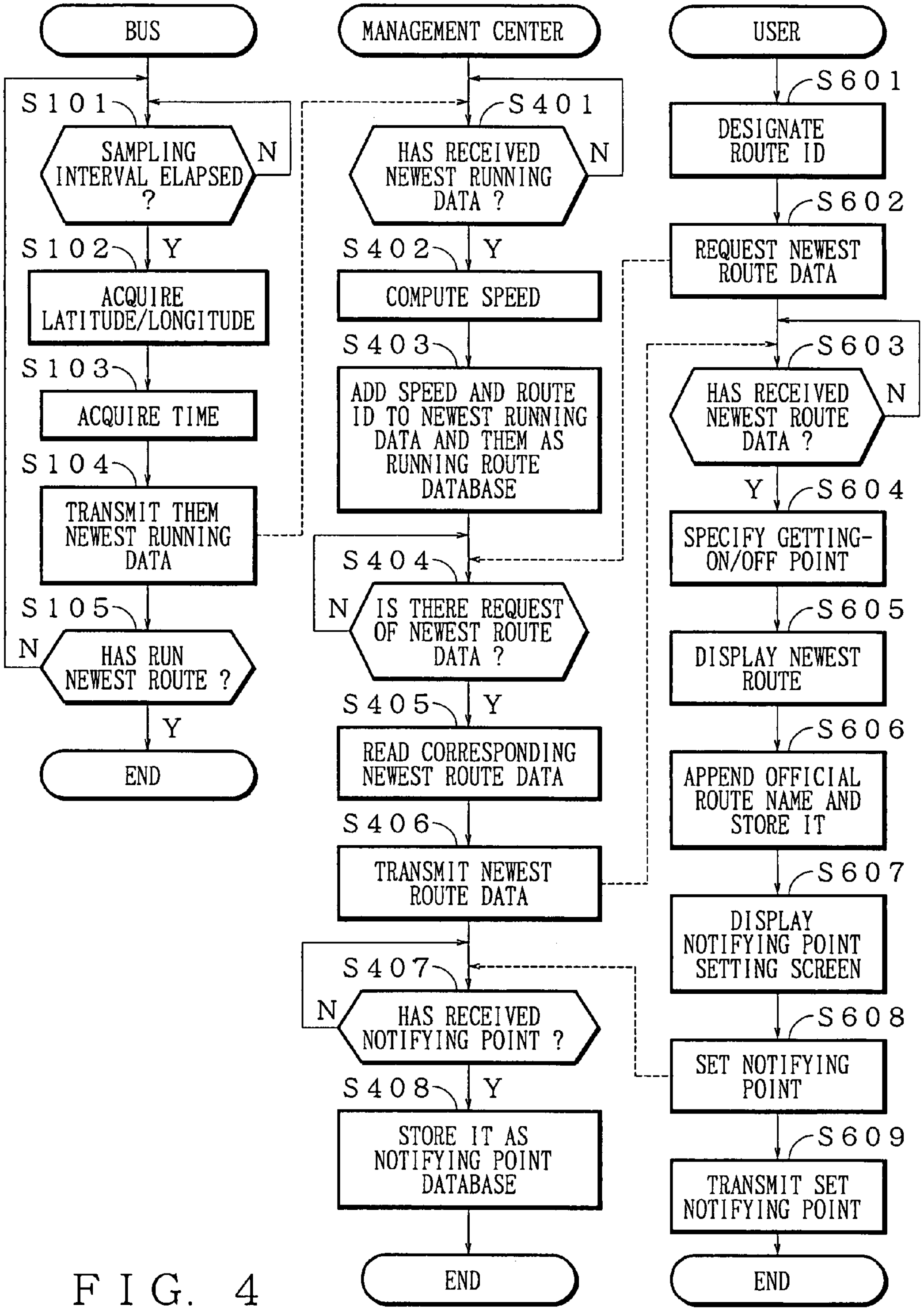
FIG. 4 is a flowchart showing the acquisition processing of the newest route and recording processing of a notifying point.
Figure 5:
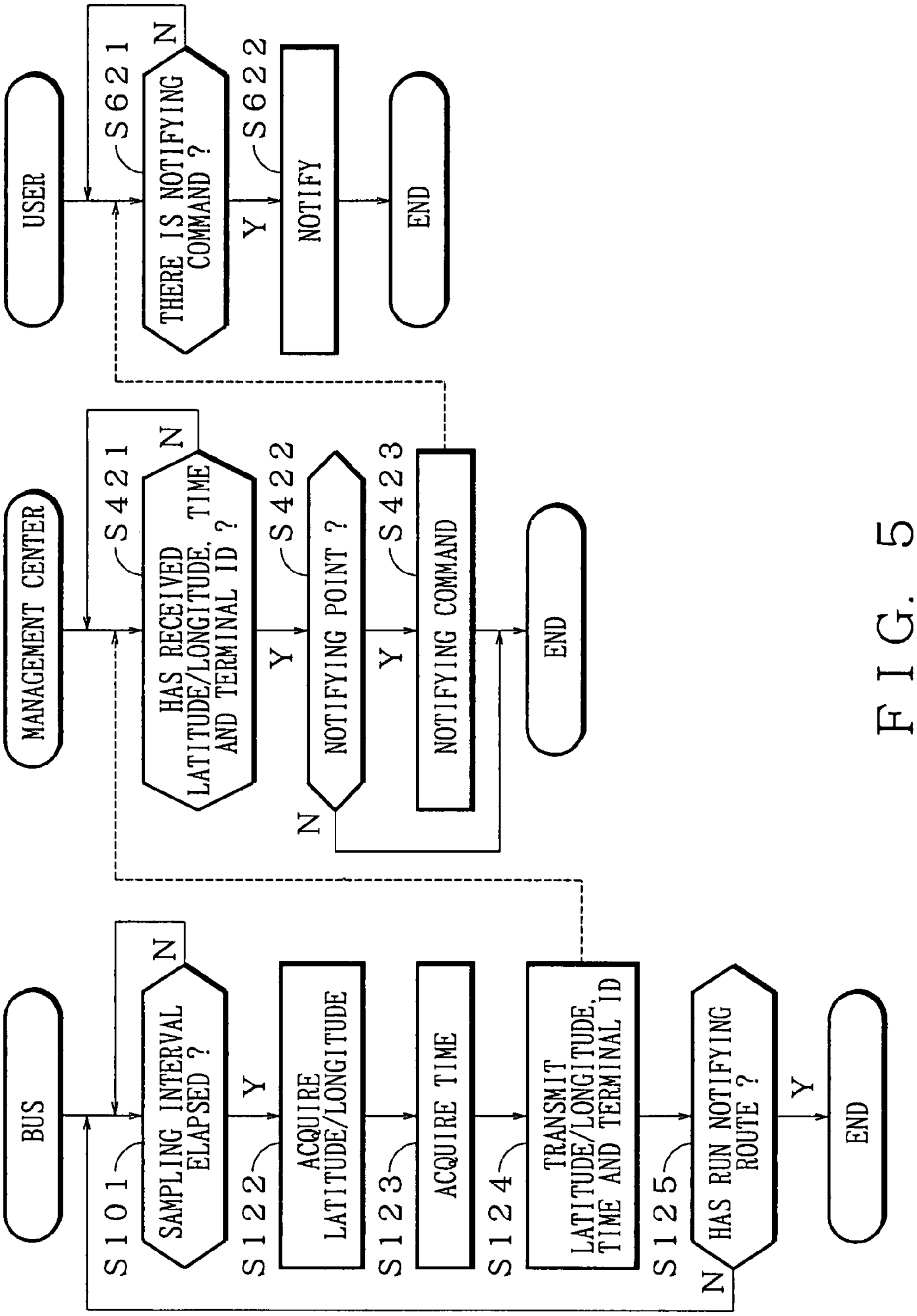
FIG. 5 is a flowchart showing the arrival notifying processing according to an embodiment of this invention.

The program file 431 is a communication control software permitting the communication with the GPS terminal 11 or control according to this invention as shown in FIGS. 4 and 5, as described later. The user database 432 incorporates a subscriber list, contact places, etc. The map database 433 incorporates map data inclusive of the topography in the vicinity of the running route, roads and area names, etc. The map database 433 may be a stand-alone type provided in the form of e.g. DVD-ROM, or may be provided from the map information providing site connected to internet. The route data base 434 incorporates the data transmitted from each of buses, e.g. a collection of the running data consisting of the time 434*b*, speed 434*c* and latitude/longitude 434*d* corresponding to a route ID 434*d*. The notifying point database 435 is a collection of notifying point data of the notifying points set on running routes by respective users.

The connecting center 32 connected to the management center 4 is communication-connected to the internet 5 as well as to the cellular telephone packet communication network 3. The internet 5 includes an known internet applicable cellular telephone network. The internet 5 is also communication-connected to the internet terminal 61 and the internet applicable cellular telephone 62 on the side of the user. The internet applicable cellular telephone network may be an "i-mode service" serviced by NTT Docomo corporation, an "Ezweb" serviced by KDDI Corporation, or may be "J-sky" serviced by Vodafone Corporation.

The home 60 for a user is provided with the above internet terminal and connecting device 61*a* connected thereto. The internet terminal 61 serves to notify that the touring bus 1 has arrived at a set desired point using an audio or video signal and may be an alarm lamp set such as "patlite" (registered trademark). The arrival notification can be performed using the internet applicable cellular telephone 62. Therefore, the arrival notification can be recognized surely even while the user is in the bathroom or out. The transmission/reception function of the internet terminal 61 corresponds to the communication means on the side of the user, and the notifying device 61*a* corresponds to the notifying means defined in Claims.

Figure 3:
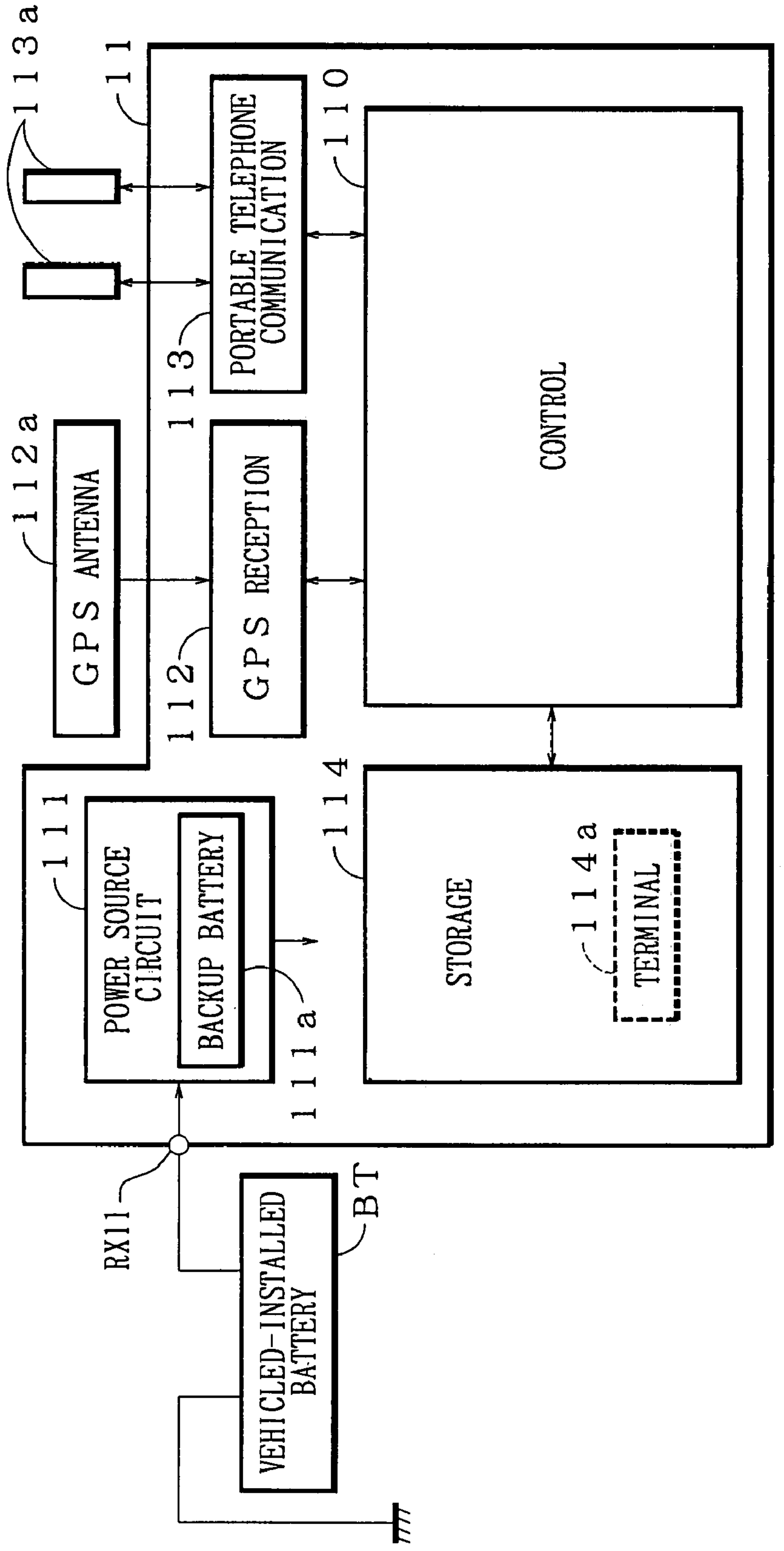
FIG. 3 is a block diagram showing the arrangement of a GPS terminal.

FIG. 3 is a block diagram showing the configuration of the GPS terminal 11. As shown in FIG. 3, the GPS terminal 11 is power supplied from a vehicle-equipped battery BT of the touring bus 1. Although not shown, between the GPS terminal 11 and the vehicle-equipped battery BT, an engine key switch is located which has an off-position, an accessory position, an on-position, and an engine start position. The GPS terminal 11 includes a control section 110, a power supply circuit 111, a GPS receiving section 112, a cellular telephone communication unit 113 and a storage section 114.

The control section 110 may be a microcomputer which basically includes a CPU, ROM and RAM. The CPU performs various kinds of processing inclusive of the control relative to this embodiment in accordance with the control program stored in the ROM. The RAM stores the data, program, etc. which are necessary for the CPU to perform various kinds of processing. The control section 110 serves to read the terminal ID 114*a* stored in the storage section 114, control the GPS receiving section 112 to acquire the latitude/longitude and time and issue a reporting command, thereby performing the control according to this invention. This will be described later in detail referring to FIG. 4 et seq.

The power supply circuit section 111 may be basically a DC transformer circuit. The battery voltage from the vehicle-equipped battery BT which is applied to a power supply input terminal RX11 is converted into a voltage suitable to each electronic circuit section of this device 11, e.g. 5 V by the DC transformer circuit included in the power supply circuit section 111. Incidentally, the power supply circuit 111 incorporates a backup battery 111*a* which serves as an auxiliary power source when the vehicle-equipped battery BT is cut off intentionally. The power supply circuit section 111 may be included in a box separate from the GPS terminal 11.

The GPS receiving section 112 serves to receive a GPS signal through a GPS antenna 112*a* from one of a plurality of GPS satellites 2 which constitute the GPS to acquire the present latitude/longitude and time and supply this information to the control section 110. The cellular telephone communication section 113 is wireless-connected to the wireless base station 31 of the cellular telephone packet communication network 3. These GPS receiving section 112 and cellular telephone communication section 113 may be known devices. The cellular telephone communication section 113 corresponds to the communication means on the side of the terminal defined in Claims.

The storage section 114 stores at least the terminal ID 114*a* for specifying the GPS terminal 11. The terminal ID 114*a* may specify the GPS terminal 11 or the touring bus 1 incorporating the GPS terminal 11.

Figure 6:
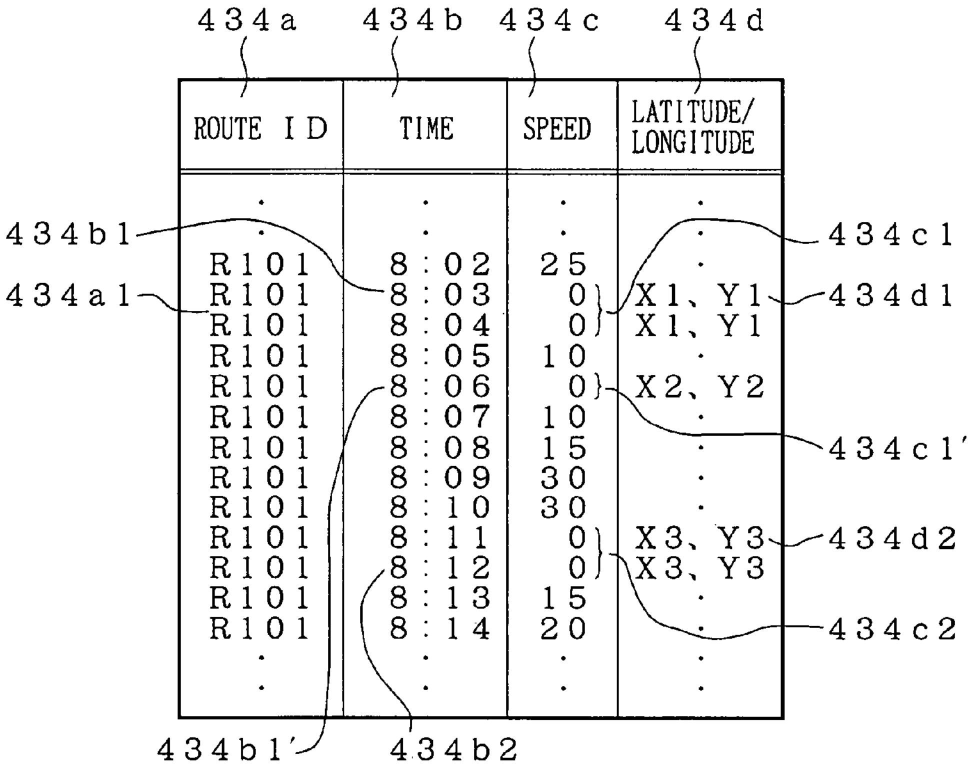
FIG. 6 is a view showing an example of running route data.
Figure 7:
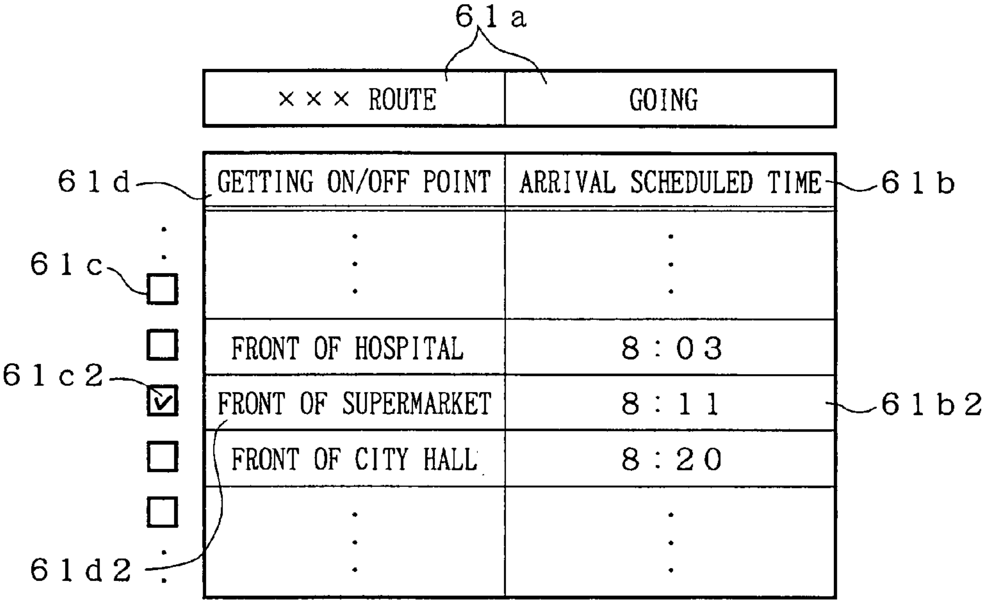
FIG. 7 is a view showing an example of a notifying point setting screen.
Figure 8:
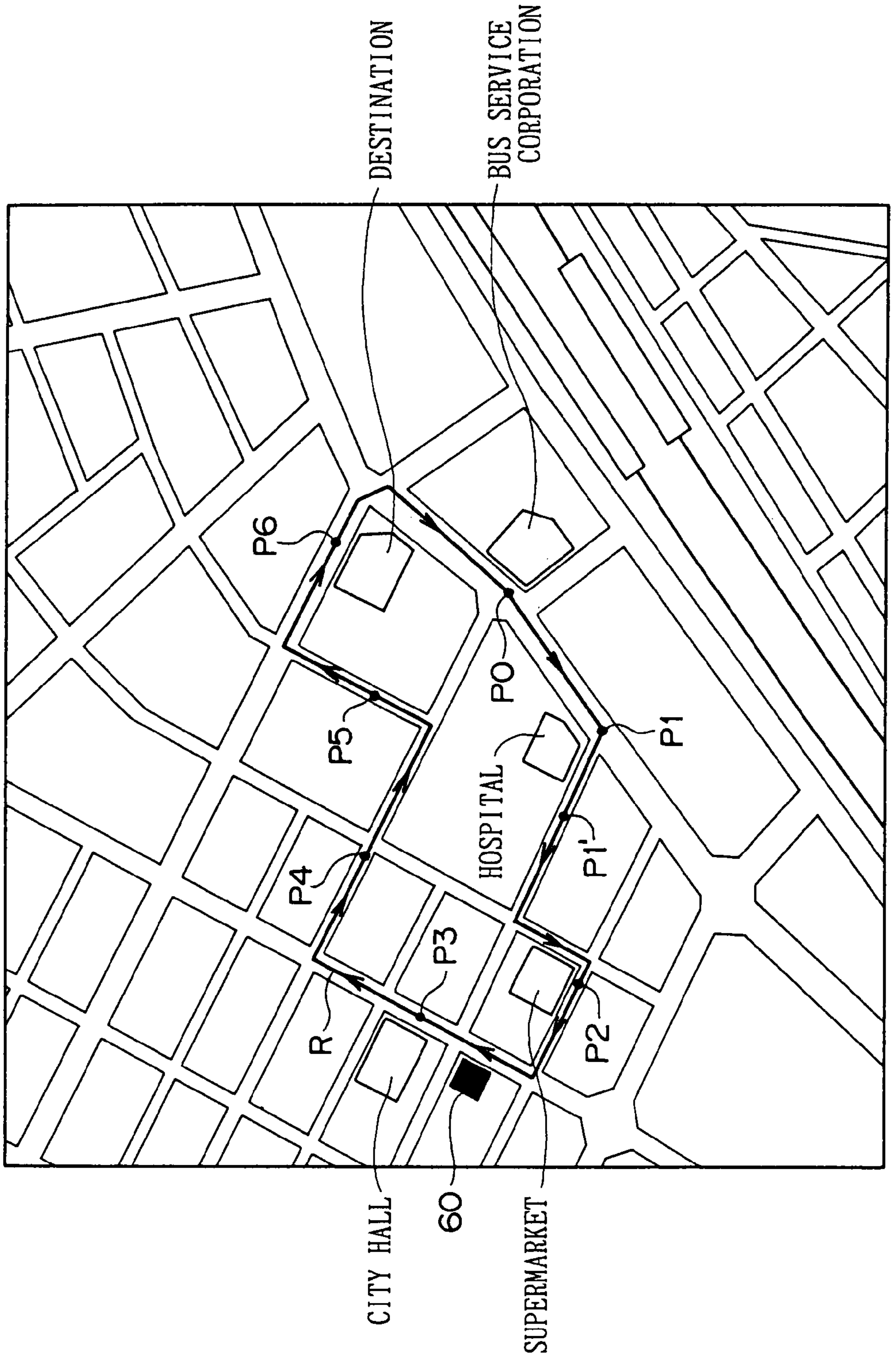
FIG. 8 is a view showing an exemplary display of the newest route acquired.
Figure 9:
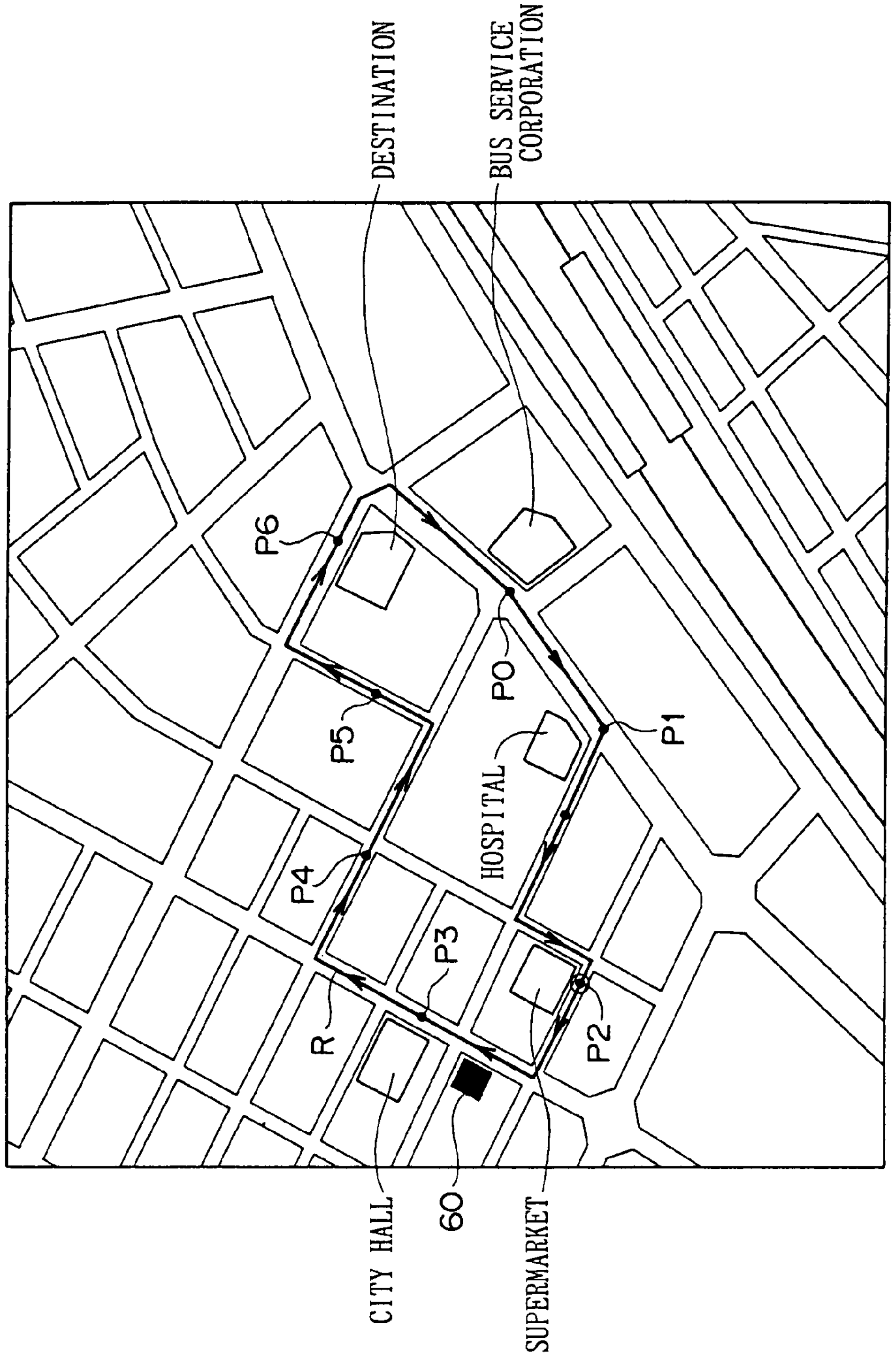
FIG. 9 is a view showing another example of a notifying point setting screen.

Now referring to FIGS. 6 to 9 and using FIG. 4, an explanation will be given of the acquisition processing of the newest route and the recording processing of the notifying point according to an embodiment of this invention having the configuration described above. FIG. 4 is a flowchart the acquisition processing of the newest route and the recording processing of the notifying point according to the embodiment of this invention having the configuration described above. FIG. 6 is a view showing an example of running route data. FIGS. 7 and 9 are both views showing a notifying point setting screen. FIG. 8 is a view showing an exemplary display of the newest route acquired. Incidentally, although the processing shown in FIG. 4 is actually performed by a plurality of buses and users, only one is illustrated on each of the bus and user sides.

In this embodiment, it is assumed that the running route of the touring bus 1 has been changed. Namely, it is assumed that the touring bus 1 runs the newest running route in accordance with the running schedule thus changed.

In this case, in the bus side processing shown in FIG. 4, at the GPS terminal 11, for each of sampling intervals elapsed (N in step S101), the latitude/longitude and time are acquired (steps S102 and S103). The sampling interval is e.g. one minute. The latitude/longitude and time thus acquired as well as the terminal ID 114*a* of the GPS terminal 11 are wireless-transmitted to the management center 4 (step S104). Incidentally, since the latitude/longitude is acquired for each prescribed time interval, the time can be acquired using the timer installed in the management center 4. Therefore, the time information may not necessarily be acquired from the GPS signal. However, if the time information is acquired from the GPS signal, the time when the latitude/longitude has been acquired can be known more accurately. Incidentally, the following description will be made on the assumption that the time information is acquired from the GPS signal. The steps S102 and S103 correspond to latitude/longitude acquiring means and time acquiring means defined in Claims.

The processing in steps S101 to S104 is continued until the bus at issue has run the entire newest running route (N in step S105). Namely, the running data is transmitted to the management center for each one minute until the bus has run the entire newest running route. These running data are transmitted from the cellular telephone communication section 113 to the information processing device 41 through the cellular telephone packet communication network 3, connecting center 32 and communication device 42 of the management center 42.

On the side of the management center 4, the running data are received by the information processing device 41 until the data transmission from the side of the bus is completed (N in step S401). When the data reception has been completed (Y in step S401), the speed is calculated (step S402). This speed is employed to specify the getting-on/off point on the side of the user. This speed can be calculated on the basis of the latitude/longitude and time contained in the running data. In this embodiment, although the speed is calculated in the management center, it may be also calculated by the user.

After the speed has been calculated, as shown in FIG. 6, the speed 434*c* and route ID are added to the newest running data. The result is stored in the storage device 43 as running data route database 434 (step S403). It is assumed that the route ID is individually allotted to each running route and also known by the user. The route ID is allotted so that a going route and a returning route included in the running route are distinguishable.

On the side of the user, in order to acquire the newest running route, the corresponding route ID is designated using the input unit of the internet terminal 61 (step S601). In response to this designation, the internet terminal 61 requests the newest route data as well as the route ID from the management center (step S602). This request is transmitted to the information processing device 41 through the internet 5, connecting center 32 and the communication device 42 of the management center 4.

On the side of the management center 4, the reception of the request of the newest route with the route ID is awaited (N in step S404). When it is received by the information processing device 41 (Y in step S404), the newest route data corresponding to the route ID is read from the route database 434 of the storage device 43 (step S405). The newest route data thus read is transmitted to the internet terminal 61 on the side of the user through the communication device 42, connecting center 32 and internet 5.

On the side of the user, the reception of the request of the newest route data with the route ID is awaited (N in step S603). When it is received by the internet terminal (Y in step S603), the getting-on/off point is specified from the speed contained in the newest route data. For example, if the newest route data as illustrated in FIG. 6 is received, it can been seen that the speed is zero at times 8:03 and 8:04 (434*b*1) and times 8:11 and 8:12 (434*b*2). In this case, the points corresponding to the speed of zero can be specified from the latitudes/longitudes X1/Y1 (434*d*1) and X3/Y3 (434*d*2) so that these points are specified as the getting-on/off points.

In this way, using the speed of the bus, the getting-on/off points can be specified easily and surely. In this embodiment, the continuous sampling timings, i.e. the point while the bus stops for two minutes is specified as the getting-on/off point. However, the point while the bus stops for the time succeeding two minutes may be adopted as the getting-on/off point. Further, for example, in the case where sampling of the latitude/longitude is made at intervals of 30 seconds, the point where the bus speed is zero at successive four times may be specified as the getting-on/off point. In this way, as occasion demands, the manner of specifying the getting-on/off point may be changed so as to correspond to actual data. Incidentally, steps S603 and S604 correspond to the bus data acquisition means and the getting-on/off specifying means defined in Claims.

Further, the newest route can be specified from all the latitudes/longitudes corresponding to the route ID indicated by the R101 included in the received newest route data. The newest route R thus specified and the getting-on/off points P1, P2, P3, P4, P5 and P6 are displayed on the display section of the internet terminal 61, which are superposed on the map of the area relative to the route as shown in FIG. 8 (step S605). The map data may be acquired from the map data base 433 of the management center 4, or from the map software previously installed in the internet terminal 61. Running starting point P0 and reference point P1' are also preferably displayed. The running starting point P0 can be specified from the latitudes/longitudes included in the newest route data. The reference P1' can be specified from the latitude/longitude when the bus speed becomes zero once as indicated by 434*c*' in FIG. 6. Such a reference point P1' permits the getting-on/off point to be specified as the normal getting-on/off point by a manual command even when the stopping time is relatively short at the normal getting-on/off point for any reason.

The newest route R thus acquired is preferably stored together with its formal name in the storage section of the internet terminal 61 (step S606). The newest route R with the formal route name may be transmitted to the management center and stored there. It is needless to say that the formal route name includes the information for discriminating between the going route and the returning route. In this way, storing the formal route name as well as the running route including the getting-on/off points is efficient to refer to or change later.

Upon completion of the acquisition processing of the newest route R as described above, recording processing of the passing points is started. Specifically, a notifying point setting screen is displayed on the display section by a prescribed switching operation at the input section of the internet terminal 61 (step S607). In this case, the newest route R stored in the internet terminal 61 or management center is read, and the notifying point setting screen is displayed thereon. Although not shown here, where the newest route R is stored in the management center, the user designates the above formal route name (inclusive of a going/returning route) and accesses the management center 4 to acquire the corresponding newest route R.

On the notifying point setting screen, as shown in FIG. 9, the newest route R inclusive of the getting on/off points P1, P2, P3, P4, P5 and P6 specified in the manner described above is previously superposed on the map, and a desired point can be designated as a passing point using the input device such as a mouse. For example, when the getting-on/off point P2 is set (step S608), as shown in FIG. 9, this point is marked so as to be distinguishable from the other points. Although the notifying point may not be necessarily selected from the getting-on/off points P1, P2, P3, P4, P5 and P6, it can be easily selected from these points as standard points. Incidentally, step S608 corresponds to the notifying point setting point defined in Claims.

The notifying point setting screen may be made in the form of a list as shown in FIG. 7. This list is preferably displayed together with the map as shown in FIG. 9. As seen from FIG. 7, this list includes at least a route name (61*a*), a getting-on/off point name (61*d*), an arrival scheduled time (61*b*) and notifying point checking box (61*c*). The route name 61*a* is given in step S606. The getting-on/off point name 61*d* and arrival scheduled time 61*b* can be derived from the latitudes/longitudes 434*d* and times 434*b* of the route data in FIG. 6. Referring to such a list, using the input device such as the mouse, the user marks the checking box 61*c* beside the getting-on/off point which is desired to be set, as indicated by 61*c*2. Particularly, since a scheduled passing time is also written beside the getting on/off point, the user can set a notifying point where he can surely get on the desired bus.

Upon completion of setting the notifying point, the notifying point thus set is transmitted to the management center (step S609). The transmission path of the notifying point from the user to the management center has been described above.

The management center is ready to receive the notifying point (N in step S407). If the notifying point is received by the information processing device 41 (Y in step S407), it is stored in the storage device 43 as the notifying point data base 435. In this way, the processing of recording the notifying point is completed.

Referring to FIG. 5, an explanation will be given of touring bus arrival notifying processing. FIG. 5 is a flowchart showing the touring bus arrival notifying processing according to an embodiment of this invention. Although this processing is also performed on the sides of a plurality of buses and users, a single bus and a single user are illustrated. Further, it is assumed that the touring bus 1 runs the notifying route with the above notifying point set.

In the arrival notifying processing shown in FIG. 5, steps S121 to S125 on the bus side, which correspond to the steps S101 to S105 in FIG. 4, are not described here. It is assumed that the touring bus 1 the touring bus 1 runs the notified route with the above notifying point set.

On the side of the management center, until the data transmission from the bus side is completed, the running data are received at prescribed intervals, e.g. one minute (N in step S421). When the running data are received, the latitude/longitude included in the running data is compared with the notifying point on the notifying route in the notifying point database 435 stored in the storage device 43. When both agree with each other, it is decided that the touring bus 1 has arrived at the notifying point (Y in step S422). A notifying command indicative of this fact is transmitted to the user who has set the notifying point (step S423). The transmission path of this notifying command from the management center to the user is the same as described with reference to FIG. 4. Incidentally, the above steps S422 and S423 correspond to the command issuing means defined in Claims.

The user is ready to receive the notifying command (N in step S621). If the notifying command is received at the internet terminal 61 (Y in step S621), the notifying device 61*a* connected to the internet terminal 61 is driven so that the fact that the touring bus 1 has arrived at the set desired point is notified to the user via an audio or video signal. This notification can be made in such a way to output the notifying name as the audio signal, or otherwise output when the bus will arrive at the getting-on/off point of the user. This notification can be made using the internet applicable cellular telephone 62.

In this way, in accordance with this embodiment, the user can acquire the running route including the getting-on/off point easily and quickly. Particularly, using the speed calculated from the acquired latitude/longitude and time, the getting-on/off point can be specified accurately without performing complicate information acquisition and computing processing. In accordance with this embodiment, the user can easily set his desired notifying point without the assistance by the person in charge of the management center 4. Further, the change in the running route or individual difference in users can be flexibly dealt with. Further, since the notifying command is issued not when the bus approaches a certain area but when the bus arrives at a desired notifying point, the user can set an accurate notifying point where he does not miss his desired bus.

Incidentally, in the running route acquisition system according to this invention, the running route to be acquired may not be necessarily the newest route immediately after the running route has been changed. The running route acquisition system according to this invention can be employed when the user loses the information relative to the running route and needs this information instantaneously. When not only the user but also the bus enterprise confirms whether or not the bus is actually running the designed route, the running route acquisition system according to this invention can be employed. In this case, the processing by the user shown in FIG. 4 may be performed by the bus.

What is claimed is:

1. A touring bus running route acquisition system for permitting a user of a touring bus to acquire a newest running route of the touring bus inclusive of a getting-on/off point, comprising:

on a side of the touring bus running the newest running route, latitude/longitude acquisition means for acquiring its own latitude/longitude at predetermined sampling periods;

time acquisition means for acquiring time of day when the latitude/longitude is acquired; and terminal side communicating means having a function of wireless-transmitting the latitude/longitude and the time of day thus acquired, and on a side of the user, notifying point setting means for setting a notifying point on the newest running route, wherein the user is notified when the touring bus arrives at the notifying point;

notifying means for notifying the arrival in response to a predetermined notifying command received on the side of the user:, bus data acquisition means for acquiring the latitude/longitude and the time of day provided by the touring bus; and a getting-on/off point specifying means for specifying a getting-on/off point on the basis of a speed computed from the latitude/longitude and the time of day, the system further comprising storage means for storing the newest running route by the bus running entirely to which a formal route name is appended, wherein the getting-on/off point is a point where the speed is zero at a prescribed number of times of consecutive sampling periods.

2. A touring bus running route acquisition system according to claim 1, wherein said running route is a newer running route.

* * * * *